Patented May 31, 1949

2,471,434

UNITED STATES PATENT OFFICE 2,471,434

DRY SALAD DRESSING

Mary H. Kimball, Chastain G. Harrel, and Robert O. Brown, Minneapolis, Minn., assignors to Pillsbury Mills, Inc., Minneapolis, Minn., a corporation of Delaware No Drawing. Application February 18, 1946
Serial No. 648,559

3 Claims. (Cl. 99—144)

This invention relates to a dry salad dressing and to processes for preparing the same.

It is an object of the present invention to provide a novel dry salad dressing which can be kept without substantial deterioration for long periods in ordinary storage, can be packed without being placed in water-proof containers, and can be very quickly mixed up by addition thereto of an aqueous solution to produce a fresh fluid salad dressing for immediate use.

Another object is to provide such a dry salad dressing to which numerous types of fruit and vegetable juices or other liquids can be added to quickly produce numerous kinds and variations of salad dressings to meet individual tastes.

The objects and advantages of the invention will more fully appear from the following description:

In accordance with the invention there is first prepared a dried powdered shortening such as that described generally in the application for patent of Chastain G. Harrel and Robert O. Brown entitled "Process for preparing dried powdered shortening and products produced thereby," Ser. No. 648,558, filed Feb. 18, 1946. In preparing such a dried powdered shortening, water and flour or starch are first mixed together and thereafter the starch content is gelatinized. Thereafter an edible fat, preferably a hydrogenated vegetable fat, is added and mixed with the gelatinized flour or gelatinized starch preparation, and thereafter the preparation is spray-dried to produce particles comprising fat globules encysted by dried gelatinized flour or dried gelatinized starch.

To the dried powdered shortening so prepared there is added and mixed therewith dried egg yolk and dried condiments to produce the dried salad dressing of the invention.

This dried salad dressing can be held in ordinary room storage either in bulk or in packages for long periods of time without substantial deterioration of the contents thereof. Also it can be frozen or subjected to varying temperatures without affecting the same, and there is no chance of bacterial contamination which might cause food poisoning. At any time after being prepared the dried powdered salad dressing can be mixed with any aqueous solution in a very short period of time to produce a fluid salad dressing having the same general taste and appearance as a freshly prepared salad dressing and having the same general taste and appearance of prepared salad dressings now on the market and sold only in glass or other water- and air-tight containers. Many different types of salad dressings can be prepared from the dried salad dressing of the invention to suit individual tastes. In addition to adding water alone to the dried salad dressing when it is to be made into a fluid dressing for use, the juices of various fruits, vegetables, soft drinks, and other beverages and liquids or a mixture of these, with or without other food products such, for example, as cheeses of various types, onions, chives, and other ingredients can be employed.

In preparing the dried shortening used, it is preferable to add some sugar to the water and wheat flour, other flour or starch prior to gelatinization of the starch content, inasmuch as if sugar is added before the composition forming the dried powdered shortening is dried, the dried powdered shortening as well as the other ingredients of the dried salad dressing will be more readily soluble and dispersible in water.

As an example of how a typical dried powdered salad dressing of the invention can be prepared, the following is given: In preparing the dried powdered shortening 27.3 lbs. of durum wheat flour and 15.5 lbs. of cane or beet sugar and 4.83 lbs. of corn sugar are added to 232 lbs. of water and thoroughly mixed therewith. Thereafter the mixture is brought to a boil and boiled for approximately 10 min., the boiling temperature being approximately 102° C. Thereafter 42.5 lbs. of low melting point hydrogenated vegetable fat is added to the mixture while hot and thoroughly mixed therewith for approximately 10 min. A typical fat that may be employed is one containing both cottonseed and corn oil, such fats being readily now available on the market. After the fat has been added and mixed, the composition is spray-dried at 1750 lbs. per square inch pressure, utilizing a number 72 nozzle, the tail temperature being 72° C.

The final preparation is thereafter made by mixing together 89.3% by weight of the dried powdered shortening, 5.33% by weight of commercial dried egg yolk, 3.05% salt, 0.45% dry mustard, 0.50% paprika, 0.03% mace, 0.04% white pepper, and 1.30% pulverized citric acid.

To prepare one type of fresh salad dressing from the final preparation, approximately 167 cc. of water will be added to 100 grams of the dry prepared composition and the whole will be stirred or beaten together until smooth. In place of some or all of the water any of the heretofore referred to liquids or solids or a mixture thereof may be employed.

Different types of flour or a mixture thereof may be employed if desired. Flours capable of use are wheat, corn, rye, oat, or barley flour or any other flours containing starch. In place of flour, starch can be employed, the starch being produced from any available source, such as wheat, corn, potatoes, etc.

Various oil type fats can be employed, such as corn, cottonseed, soy, peanut, and olive oils or mixes thereof or hydrogenated shortenings of various melting points, dictated by taste and other physical properties such as color and texture desired in the final salad dressing. Hydrogenated fats are preferred because of better keeping qualities and stability.

The proportions of water, flour or starch, and fat employed in producing the dry powdered shortening can be varied depending on the qualities desired in the finished dry salad dressing. The fat can run up to as high as 75% by weight of the weight of the dry powdered shortening.

Also considerable range in temperature variation and in the heating period to gelatinize the starch content can be made. When higher temperatures are employed, the shorter the heating period required and vice versa.

Also considerable variation can be made in the pressures employed, nozzles used, and tail temperatures employed in spray-drying, depending largely on the granulation desired in the dried shortening.

Although it is preferred to use dried powdered egg yolks in making up the dried salad dressing, dried whole eggs may be employed. The amount of egg yolk employed varies the emulsification of the fluid salad dressing and accordingly considerable range may be made in the amount of egg yolks employed depending on the taste desired. This variation may be from 1% to 8% by weight of the dry salad dressing.

The spices and other condiments employed and the quantities of each can be varied to suit the individual tastes. Other acids than citric acid can be employed. Thus acetic acid or other acid salts that are adaptable for food uses can be used.

It will be seen that a highly advantageous product is produced.

The invention consists in the matter described and set forth in the appended claims.

What is claimed is:

1. A dry powdered salad dressing capable of being held in storage for long periods of time without substantial deterioration and capable of being mixed with an aqueous solution to produce a wet salad dressing and consisting of a powdered dried shortening, powdered egg yolk, and powdered condiments, the dried powdered shortening being in particle form and the particles consisting of fat globules encysted in gelatinized flour and sugar.

2. A dried salad dressing capable of being held for long periods in storage without substantial deterioration and which consists of a dried powdered shortening, dried egg yolk, and dried condiments, the dried powdered shortening being in particle form and the particles consisting of fat globules encysted by gelatinized starch and sugar, the dried egg yolk consisting of from 1% to 8% by weight of the composition, the condiments consisting of from 1% to 10% by weight of the composition, and the sugar consisting of from 1% to 20% by weight of the composition.

3. A process of preparing a dried powdered salad dressing which consists in first mixing a starch-containing substance and sugar with water, gelatinizing the starch, adding an edible fat to the gelatinized starch and sugar mixture, spray-drying the mixture thus prepared to produce particles having globules of fat encysted by gelatinized starch and sugar, and thereafter adding and mixing therewith dried powdered egg yolks and dried condiments, the composition thus prepared having the property of being held for long periods in storage without substantial deterioration and yet being capable of being mixed with an aqueous solution to quickly produce a fresh fluid salad dressing.

MARY H. KIMBALL.
CHASTAIN G. HARREL.
ROBERT O. BROWN.

REFERENCES CITED

The following references are of record in the file of this patent:

UNITED STATES PATENTS

| Number | Name | Date |
|---|---|---|
| 1,431,938 | Dunham | Oct. 17, 1922 |
| 1,432,057 | Dunham | Oct. 17, 1922 |
| 1,701,085 | Richardson et al. | Feb. 5, 1929 |
| 1,928,781 | Chapin | Oct 3, 1933 |
| 2,035,899 | Kraft | Mar. 31, 1936 |
| 2,065,676 | Fechner | Dec. 29, 1936 |
| 2,168,360 | Musher | Aug. 8, 1939 |
| 2,392,833 | Chapin | Jan. 15, 1946 |
| 2,431,497 | North et al. | Nov. 25, 1947 |